July 15, 1952     C. A. ROWAND     2,603,272
FRAMEWORK FOR PLAYGROUND APPARATUS, INCLUDING SWING SETS FROM PIPES
Filed Feb. 11, 1949
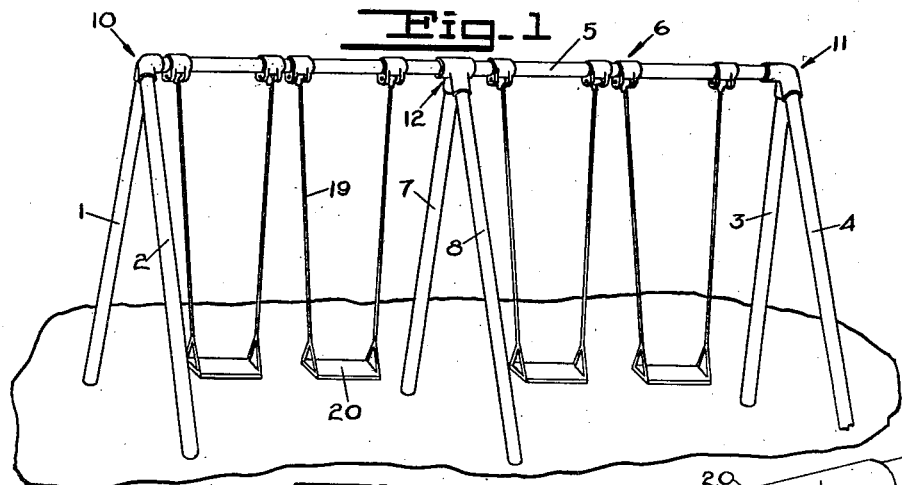
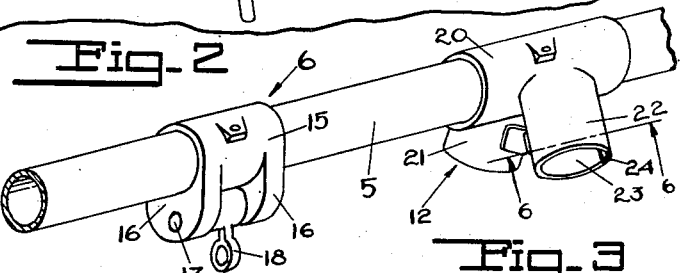
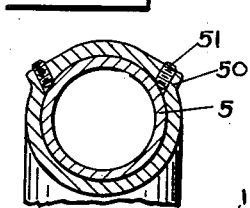
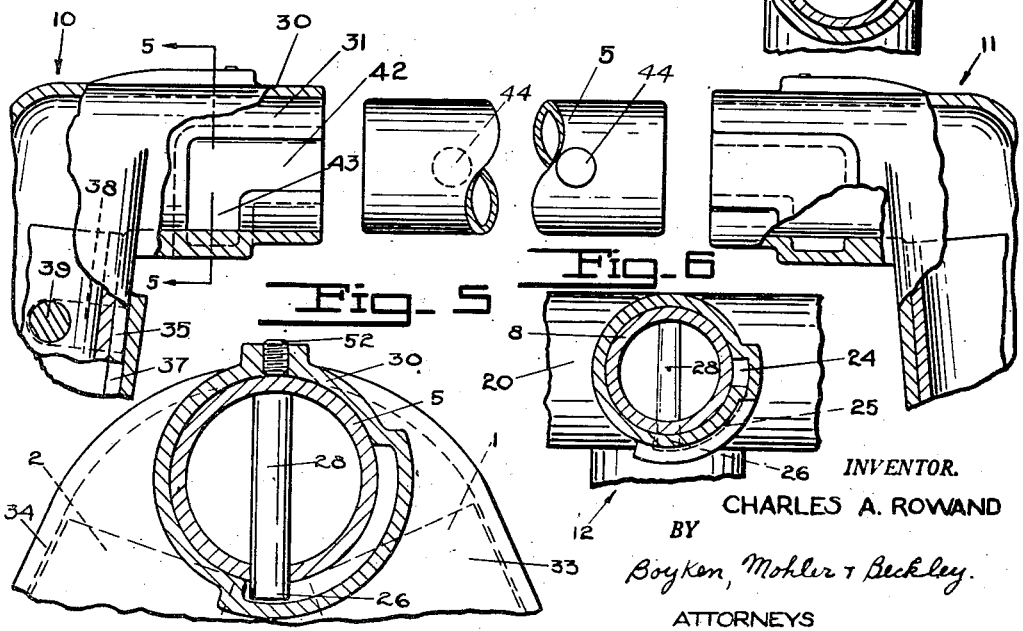
INVENTOR.
CHARLES A. ROWAND
BY
Boyken, Mohler & Beckley.
ATTORNEYS Patented July 15, 1952

2,603,272

UNITED STATES PATENT OFFICE 2,603,272

FRAMEWORK FOR PLAYGROUND APPARATUS, INCLUDING SWING SETS FROM PIPES

Charles A. Rowand, Menlo Park, Calif.

Application February 11, 1949, Serial No. 75,775

6 Claims. (Cl. 155—58)

This invention relates generally to framework for playground apparatus, such as swing sets, horizontal bars, etc.

Playground apparatus, such as swing sets, are customarily fabricated from pipe, the legs extending convergently upwardly from the ground and connected at their upper ends to a horizontal pipe that may, in itself, be a horizontal bar for gymnastic exercises, or may carry the swing hangers for swings.

Heretofore in a swing set which includes two groups of outer supports and a pair of legs intermediate the length of the swing set approximately forty bolts have been required to secure the elements in place. The end connections in conventional equipment are generally each split into two parts to permit securement of the adjacent legs and also a brace extending slantingly downwardly and outwardly of the swing and secured at its upper end to the connection. Each brace and leg is secured to the end connection by two bolts and the two bolts which are required to secure the horizontal bar in place make a total of eight for each end or sixteen for both ends.

The two intermediate legs are generally secured by three bolts, one of the bolts contributing to the securement of both legs; four bolts are required to secure the horizontal bar to the intermediate connection making a total of seven for the intermediate connection which generally is split into three parts.

In addition to the above described twenty-three bolts, two bolts are required for each of the two swing hangers of each swing of a four-swing set. This accounts for an additional number of sixteen, giving a grand total of thirty-nine.

It is obvious from the foregoing how the accidental loosening of the fittings and hangers from the main horizontal bar is something that easily occurs, and has resulted in fatal accidents.

It is pertinent to note that children are prone to loosen accessible bolts and nuts, and in much school equipment, this is guarded against by employing fasteners that are not accessible. However, in playground equipment where danger from accident is great, it is still customary to employ easily loosened nuts and bolts to hold the parts together.

One of the objects of the present invention is the provision of a pipe frame for playground apparatus having pipe legs and a horizontal pipe, in which there is no possibility for the legs and pipe becoming accidentally separated when in use.

A further object of the invention is the provision of bolt and thread-free pipe connectors in playground apparatus adapted to be more quickly assembled with the pipe in pipe connecting relationship than heretofore, and which connectors, when so assembled, positively lock the pipe lengths together against any accidental separation.

An added object of the invention is a swing set having a pipe framework, including legs and a horizontal pipe supported thereby, including swing supports on said pipe, all adapted to be quickly assembled in inseparable relationship insofar as accidental separation is concerned, as long as the legs are securely fastened stationary at their lower ends, and which supports cannot be removed from the bar unless the legs are free from anchorage to the ground or floor and free from the connecting means between the legs and bar at one end of the latter.

Another object is the provision of a swing set or other playground apparatus, including upwardly convergently extending pipe legs removably connected at their upper ends by fittings to the ends of a horizontal pipe, and which structure is such that the said ends of the pipe are supported directly on the upper ends of said legs, thereby relieving the fittings of the greater part of the load that may be put on the pipe.

Other objects and advantages will appear in the description and in the drawings.

In the drawings,

Fig. 1 is a perspective view of a swing set.

Fig. 2 is an enlarged, fragmentary perspective view of part of the upper pipe of the swing set (partly in section) including one only of the swing hangers thereon, and one fitting at the near end of the pipe, and one intermediate fitting on said pipe at a point intermediate its ends. No legs are shown in this view, and the far end fitting on the pipe corresponding to the one at the near end is omitted, as are all swing hangers except one.

Fig. 3 is a fragmentary vertical cross-sectional view taken centrally through one of the swing hangers.

Fig. 4 is an enlarged, part sectional, part elevational, fragmentary view showing the bayonet joints between the opposite ends of the horizontal pipe and the end fittings to which the legs are connected. The swing hangers are omitted and the horizontal pipe is shown separated at its ends from the end fittings in order to clearly show the structure of the joints between the bar and the end fittings.

Fig. 5 is an enlarged, fragmentary sectional view taken along line 5—5 of Fig. 4, but with the end of the horizontal pipe of Fig. 4 secured within the end fitting in interlocking relationship.

Fig. 6 is an enlarged fragmentary sectional view taken along line 6—6 of Fig. 2.

While the illustration (Fig. 1) shows a swing set, it is to be understood that other playground equipment may use the same structure insofar as the pipe connectors are concerned. It might be pointed out here that in playground equipment the threading of pipe ends and their threaded securement in fittings does not provide the necessary strength and safety, and is not used. Any weakening of the pipe, as by cutting threads therein, or the forming of holes where there may be a strain, is not acceptable.

In the drawings, the swing set illustrated in Fig. 1 comprises two pairs of convergently upwardly extending pipe legs, the legs of one pair being designated 1, 2 and the legs of the other pair being designated 3, 4.

Extending horizontally between the upper convergent ends of said legs is a horizontal pipe or bar 5 on which the swing hangers, generally designated 6, are secured.

Intermediate the pairs of legs 1, 2, 3 and 4 is a brace that also comprises pipe legs 7, 8 that correspond with legs 1, 2.

Fittings, generally designated 10, 11, respectively connect the upper ends of legs 1, 2 and the upper ends of legs 3, 4 to the opposite ends of pipe 5.

Another fitting, generally designated 12, connects the upper ends of legs 7, 8 with the pipe 5.

It is to be understood that in a relatively small swing set, the pipe legs 7, 8 and fitting 12 may be omitted, while in a relatively large swing set, other braces corresponding with pipe legs 7, 8 and fitting 12 may be used.

The swing hangers, being approximately the first elements to be placed in assembled relationship with the other elements, will be described first.

Each of these hangers is formed to provide an annular unitary sleeve portion 15 (Figs. 2, 3) from which may depend a pair of horizontally spaced ears 16, and between which ears a horizontal pivot pin 17 extends, and to which ears the pin is secured as by upsetting the ends of said pins. An eye member 18 is pivotally carried by pin 17 and the swing chain or rope 19 is secured to the eye member.

A pair of adjacent hangers 6 carry eye member 18 and the chains, ropes, or bars suspended therefrom carry the seat 20 at their lower ends. The present invention is not concerned with the means that connects the hangers with the seat.

The cylindrical sleeve portion 15 of each hanger is adapted to slide along the pipe 5 to the desired position.

Where bracing legs 7, 8 are required, the fitting 12 is also positioned on pipe 5. This fitting includes a continuous, annular, cylindrical portions, designated 20 (Fig. 2), which is cast integrally with divergently downwardly extending, hollow, relatively short, cylindrical arms 21, 22 that form generally downwardly directed cylindrical walled recesses 23 in which the upper ends of legs 7, 8 are adapted to slidably and revolvably fit.

The cylindrical inner sides of each of the recesses 23 are formed with right angle, radially inwardly directed recesses, one run 24 of each such right angle recess extending axially of the arm in which it is formed (Fig. 6) and opening axially outwardly of said arm at one end, while the other run 25 of the right angle recess opens into the said one run 24 at one end and extends circumferentially around the cylindrical inner side of the arm for a relatively short distance. The upper end of each pipe leg 7, 8 carries a radially outwardly projecting stud 26 that is adapted to follow the right angle recess into each arm of fitting 12 and then circumferentially of the arm, thus providing a bayonet joint locking legs 7, 8 in arms 21, 22 respectively.

The stud 26 is preferably the projecting end of a pin 28 (Fig. 6) that extends radially across the axis of each pipe and which pin is welded to the pipe or secured thereto in any positive and suitable manner. Obviously, once the pipe ends are locked within arms 21, 22 the pins 28 cannot possibly come out, even if they were a extend loosely through the hole in one side of each of the pipes 7, 8.

The end fittings 10, 11 are identical. End fitting 10 will be described in detail, it being understood that the same description applies to the fitting 11.

The end fitting 10 comprises a casting formed with a laterally projecting cylindrical arm 30 that in turn, is formed with a cylindrical walled recess 31 (Fig. 4) coaxial therewith and opening laterally outwardly of said arm 30. The opposite end of the recess is closed.

The same casting having arm 30 is formed with a pair of divergently downwardly extending arms 33, 34 (Fig. 2) that are each formed with a coaxial cylindrical walled recess 35 communicating at their upper ends with the inner end of the recess 31.

The recesses 35 are identical with the recesses 23 that are respectively formed in arms 21, 22 of the fitting 12, and they each have radially inwardly openings right angle recesses 37, 38 (Fig. 4) that are identical with the recesses 24, 25 respectively formed in the arms 21, 22.

The upper end of each pipe leg carries a stud pin 39 in the same manner as the pin 28 is carried at each end of pipe 7 or 8, and which pin projects at one end into the right angle recess in each arm 33, 34, and is locked in the run 38 of said recess when the pipe legs are rotated after the stud has passed along the run 37 of the right angle recess. In Fig. 2 the outwardly projecting enlargements 40 are indicated on the end fittings, and within which enlargements the circumferentially extending run 38 of each right angle recess is formed.

The inner side of the cylindrical walled recess 31 in arm 30 is formed with a right angle recess that is structurally the same as the right angle recesses in arms 33, 34 of the end fitting and arms 21, 22 of the intermediate fitting 12.

The right angle recess opening radially into arm 30 has a horizontal run 42 that extends axially of said recess 31 and that opens at one end outwardly of arm 30. The other run 43 of the right angle recess extends a short distance circumferentially of the cylindrical wall of recess 31 (Fig. 4).

Pipe 5 carries a stud pin 44 adjacent, but spaced from the terminating end of the pipe 5 that is received in arm 30. This stud pin projects from a side of the pipe 5 and is adapted to follow the right angle recess for locking the pipe 5 to the end fitting against separation therefrom when the pin is in the portion 43 of said right angle recess.

It will be seen from Fig. 4 that the end fittings 10, 11 are identical, and the opposite ends of pipe 5 are the same, except that the stud pin 44 at the end of the pipe adapted to be received in fitting 11 projects from the opposite side of the pipe 5. Inasmuch as the fittings 10, 11 are identical, when they are positioned so that the recesses 31 are in opposedly opening relationship, the right angle recess in fitting 11 will be at the opposite side of leg 30 from that of fitting 10. For this reason, when fittings 10, 11 are locked on the ends of pipes 5 with their divergently downwardly extending arms in opposed relationship at opposite ends of pipe 5, the pipe 5 cannot be rotated in either direction as long as the fittings 10, 11 are held stationary. As long as the pipe 5 cannot rotate relative to the fittings, or as long as the fittings cannot rotate on the pipe 5, it is impossible to detach the pipe from the fittings.

In actual practice, after the fittings 10, 11 are secured on pipe 5, and after the legs 1 to 4 inclusive, are locked in the fittings 10, 11, the lower ends of said legs are preferably firmly anchored in concrete, although in inside installations they may be securely bolted to the floor.

Inasmuch as there can be no separation of the legs 1 to 4 inclusive, from the fittings 10, 11 after the fittings are on the legs and after the legs are anchored stationary, it is obvious that the hangers 6 and whatever fittings 12 are to be used, must be put on pipe 5 before the fittings 10, 11 are securely locked in position. Once the hangers 6 and fittings 12 are on the pipe 5 and the legs 1 to 4 are anchored stationary with the fittings 10, 11 locked on pipe 5, it is impossible to separate any of the hangers or fittings 12 from the pipe 5.

From the foregoing, it will be seen that no matter if the hangers 6 or fittings 12 should be loose, there can be no harm since they cannot come off the pipe 5. While the legs 1 to 4 inclusive, seldom, if ever, become loosened from their anchorage in the ground, even such mere loosening would not release the pipe 5 from the end fittings and legs.

Inasmuch as there might be a slight rattle between the hangers 6 and fittings 10, 11, 12 and the pipe 5, if the hangers and fittings were not snugly held to pipe 5, the fittings 12 and hangers 6 are each provided with threaded openings 50 (Fig. 3) therethrough extending generally tangentially of a circle concentric with the axis of pipe 5, so that set screws 51 threaded in said openings will obliquely engage the pipe at points along opposite sides thereof, although not quite at diametrically opposite points. In this manner rotation of the hangers 6 on pipe 5 is positively prevented, as well as longitudinal movement of the hangers on said pipe, and there is no rattle between the fittings 12 and the pipe 5, nor between the hangers 6 and said pipe. Furthermore, the pipe 5 is in no way weakened.

The fittings 10, 11 may each have a threaded opening formed radially through a side of arm 30 for a set screw 52 (Fig. 2) that is adapted to engage the end of pipe 5 for positively preventing rattle between the pipe 5 and fittings 10, 11.

It is again pointed out that these set screws 50, 52 do not function to hold the fittings or hangers on the pipe 5. The bayonet joints between fittings 10, 11 and pipe 5 hold fittings 10, 11 on said pipe, and unless these fittings are removed, the hangers 6 and fittings 12 cannot be taken off the pipe. The fittings 10, 11 cannot be removed from the pipe 5 or from legs 1 to 4 inclusive, unless the legs are free from anchorage to the ground or floor.

Another important feature of the construction shown herein is the fact that the bayonet joints between the legs 1 to 4 inclusive, and fittings 10, 11 and between legs 7, 8, and fittings 12 are so arranged that the pipe 5 will be supported on the upper ends of said legs when the latter are locked in position in said fittings. By this structure the load on pipe 5 is principally taken by the legs and not by the fittings and then transmitted to the legs, as in most instances.

From the structure as described above, it will be seen that a swing set or the like, using said structure cannot possibly result in injury to children through accidental loosening of pipe 5 from the legs, or loosening of the swing hangers from pipe 5, as occurs where split pipe clamps and bolts are employed to hold the legs and horizontal pipe 5 together and for holding the swing hangers on the pipe 5.

Furthermore, the assembly of a swing by the present structure is accomplished far faster than where bolts must be inserted and tightened.

From the standpoint of economy of manufacture, the fact that end fittings 10, 11 are identical avoids the necessity for any right and left fittings. No bolts are required, which in conventional structure may become lost or injured in transit or even on the job, and in most instances the hangers 6, fittings 12 and at least one end fitting 10 or 11 can all be assembled on pipe 5 at the factory. Upon arrival at the site it is only necessary to lock legs 7, 8 in the arms of each fitting 12 and lock legs 1, 2 or 3, 4 in whichever end fitting is on pipe 5. The other end fitting can then be locked on pipe 5 and the legs locked therein, and the swing set is ready for anchorage of the legs in place. Even the swing chains and seats can be assembled at the factory, but if not, it is obvious that the entire swing set can be assembled complete in a matter of minutes as compared with hours where the conventional structure is used. Furthermore, when the present swing set is assembled it is absolutely safe. There is no chance for a loose bolt occurring with the possibility of a fatal accident to a child playing on the swing.

I claim:

1. In a framework of pipe for playground apparatus including a pair of pipe legs extending convergently upwardly from the ground to about meeting relationship at their upper ends, a horizontally extending pipe extending at one end across said upper ends and supported thereon, a unitary pipe fitting at said upper ends of said legs formed with openings in which said upper ends of said legs and said one end of said horizontally extendnig pipe are secured against separation, and means on said legs and horizontally extending pipe and on said fitting in interlocking relationship so securing said fitting to said legs and to said horizontally extending pipe.

2. In a framework of pipe for playground apparatus including a pair of pipe legs extending convergently upwardly from the ground to about meeting relationship at their upper ends, a horizontally extending pipe extending at one end across said upper ends and supported thereon, a unitary pipe fitting at said upper ends of said legs formed with openings in which said upper ends of said legs and said one end of said horizontally extending pipe are secured against separation, and means on said legs and horizontally extending pipe and on said fitting in interlocking relationship so securing said fitting to said legs and to said horizontally extending pipe, a second pair of legs at the opposite end of said horizontally extending pipe corresponding to said first mentioned legs and a second fitting formed with openings in which the upper ends of said second pair of legs and said opposite end of said horizontally extending pipe are secured against separation, means on said second fitting and on said opposite end of said horizontally extending pipe in interlocking relationship preventing rotation of said horizontally extending pipe in one direction only and said first mentioned means including parts on said horizontally extending pipe and on said first mentioned fitting in interlocking relationship preventing turning of said horizontally extending pipe opposite to said one direction.

3. In a framework of pipe for playground apparatus including a pair of pipe legs extending convergently upwardly from the ground to about meeting relationship at their upper ends, a horizontally extending pipe one end of which is adjacent said upper ends of said legs, a pipe fitting formed with outwardly opening generally cylindrical walled recesses in which said one end of said horizontally extending pipe and said upper ends of said legs are respectively fitted for rotation therein, a radially inwardly opening right angle recess formed in the cylindrical side of each of said cylindrically walled recesses opening at one end axially outwardly of said latter recesses and a projection on the end of each pipe that is fitted in each of said recesses projecting into each right angle recess providing a bayonet joint between said fitting and the end of each pipe therein, said cylindrical walled recesses being in communication with each other at their inner ends within said fitting, and said one end of said horizontally extending pipe being across and above said upper ends of said legs and in engagement therewith whereby said one end of said horizontally extending pipe and any load thereon will be substantially supported directly on said legs.

4. In a framework of pipe for playground apparatus including two pairs of pipe legs, the pipe legs of each pair extending convergently upwardly from the ground to about meeting relationship at their upper ends, a first fitting securing the upper ends of one pair of said legs together and a second fitting securing the upper ends of the other pair of legs together, said first and said second fittings each being formed with a laterally opening cylindrical walled recess the cylindrical wall of which is formed with a right angle radially inwardly opening recess one end of which opens axially outwardly of the fitting, a horizontally extending pipe provided with a radially outwardly projecting stud at each end within the inner closed end leg of each of said right angle recesses providing a bayonet joint connecting the ends of said horizontally extending pipe with said first fitting and said second fitting, said first fitting and said second fitting being identical whereby said joints will prevent rotation of said pipe in either direction when said fittings are secured to said legs against movement.

5. In a framework of pipe for playground apparatus including two pairs of pipe legs, the pipe legs of each pair extending convergently upwardly from the ground to about meeting relationship at their upper ends, a first fitting securing the upper ends of one pair of said legs together and a second fitting securing the upper ends of the other pair of legs together, said first and said second fittings each being formed with a laterally opening cylindrical walled recess the cylindrical wall of which is formed with a right angle radially inwardly opening recess one end of which opens axially outwardly of the fitting, a horizontally extending pipe provided with a radially outwardly projecting stud at each end within the inner closed end leg of each of said right angle recesses providing a bayonet joint connecting the ends of said horizontally extending pipe with said first fitting and said second fitting, said first fitting and said second fitting being identical whereby said joints will prevent rotation of said pipe in either direction when said fittings are secured to said legs against movement, unitary hangers for swings secured on said horizontally extending pipe between said first fitting and said second fitting each of which hangers comprises a cylindrical sleeve whereby said sleeves are irremovable from said horizontally extending pipe until at least one of said pairs of legs is released from the ground or from the fitting thereon to permit rotation of the fitting thereon relative to said horizontally extending pipe.

6. A swing set comprising two pairs of opposed pipe legs each pair of which extends convergently upwardly from the ground to about meeting relationship at their upper ends, a pair of fittings each formed with outwardly opening cylindrical walled recesses in which the upper ends of the legs of each pair are rotatably received, a laterally projecting stud on the upper end of each of said legs and each of said cylindrical walled recesses being formed with a radially inwardly opening right angle recess in which each stud is fitted providing a bayonet type joint between each pipe and the fitting in which its upper end is received, said pair of fittings being formed with opposedly laterally opening cylindrical walled recesses, a horizontally extending pipe fitted at its ends in each of said recesses, positive interengaging means on said horizontally extending pipe and said pair of fittings releasably securing said horizontally extending pipe to said pair of fittings against rotation of said pipe in said fittings and against removal of said pipe therefrom, and swing hangers on said horizontally extending pipe between said fittings, each of said swing hangers comprising a unitary cylindrical sleeve, set screws threadedly carried by said sleeve and extending therethrough along lines tangential to a circle concentric with the axis of said pipe for obliquely engaging said pipe at points on opposite lateral sides thereof to prevent rotation of said hangers on said pipe.

CHARLES A. ROWAND.

REFERENCES CITED

The following references are of record in the file of this patent:

UNITED STATES PATENTS

| Number | Name | Date |
| --- | --- | --- |
| 279,267 | Nock | June 12, 1883 |
| 488,349 | Bradley | Dec. 20, 1892 |
| 714,554 | Augustus | Nov. 25, 1902 |
| 1,033,187 | Metzger | July 23, 1912 |
| 1,343,124 | Galipp | June 8, 1920 |
| 1,953,774 | Rice | Apr. 3, 1934 |
| 1,975,463 | Jones | Oct. 2, 1934 |